United States Patent
Zhang

(10) Patent No.: US 9,021,453 B1
(45) Date of Patent: Apr. 28, 2015

(54) ANTI-MALWARE INSTALLATION DEPLOYMENT SIMULATOR

(71) Applicant: Malwarebytes Corporation, San Jose, CA (US)

(72) Inventor: Yadong Zhang, Sunnyvale, CA (US)

(73) Assignee: Malwarebytes Corporation, San Jose, CA (US)

( * ) Notice: Subject to any disclaimer, the term of this patent is extended or adjusted under 35 U.S.C. 154(b) by 48 days.

(21) Appl. No.: 13/943,733

(22) Filed: Jul. 16, 2013

(51) Int. Cl.
  *G06F 9/44* (2006.01)
  *G06F 11/36* (2006.01)
(52) U.S. Cl.
  CPC .................. *G06F 11/3672* (2013.01)
(58) Field of Classification Search
  CPC ................................................. G06F 11/3672
  USPC ................... 717/124–135, 168–178
  See application file for complete search history.

(56) References Cited

U.S. PATENT DOCUMENTS

| | | | |
|---|---|---|---|
| 2005/0188367 A1* | 8/2005 | Oberholtzer | 717/168 |
| 2009/0100519 A1* | 4/2009 | Tarbotton et al. | 726/23 |
| 2009/0254993 A1* | 10/2009 | Leone | 726/25 |
| 2013/0047036 A1* | 2/2013 | Pechanec et al. | 714/38.1 |
| 2013/0067578 A1* | 3/2013 | Dool et al. | 726/24 |

OTHER PUBLICATIONS

Lin Zheng, Detecting a Malware Application Prior to Installation in an Android Device , IP.com, Apr. 30, 2012, pp. 1-3.*
IP.com, Executable Integrity Verification, Mar. 23, 2011, pp. 1-9.*
Basmov et al., Management of certain types of Self-Encrypting Drive credentials, IP.com, Jul. 15, 2011, pp. 1-4.*

* cited by examiner

*Primary Examiner* — Satish Rampuria
(74) *Attorney, Agent, or Firm* — Fenwick & West LLP

(57) ABSTRACT

A deployment simulator application receives information about an anti-malware application that is to be deployed to and installed on client devices connected to a network. The deployment simulator application identifies the clients that will receive the deployed anti-malware application and performs a series of tests on the client to determine whether the anti-malware application will be able to successfully install remotely on the client. The deployment simulator application may report the results of the deployment simulation tests to an administrative client.

17 Claims, 3 Drawing Sheets

ANTI-MALWARE INSTALLATION DEPLOYMENT SIMULATOR

BACKGROUND

The present disclosure is generally related to a deployment simulator application and more specifically to the installation of anti-malware applications in an enterprise setting.

Companies and institutions often install anti-malware applications to prevent malicious software, also known as malware, from attacking and disrupting computer operations. Because enterprise networks typically include many client devices remote installation is a convenient way to install the anti-malware application throughout the network. However, remote installation of anti-malware applications is generally not tailored to the unique attributes of different clients and thus commonly fails due to a number of factors, such as differing client configurations, differing hardware specifications, inadequate network connections and so forth. Installation failures can cause broken links, corrupt files or even a crashed device.

SUMMARY

A deployment simulation application simulates an installation of an anti-malware software or application on targeted client devices. In an embodiment, the deployment simulation application receives information identifying the anti-malware application to deploy to one or more clients on a network. The deployment simulation application receives an indication of the client on which the anti-malware application is to be deployed and performs deployment simulation tests on the indicated client. These deployment simulation tests analyze whether the anti-malware application will be able to successfully remotely install on the indicated client. The deployment simulation application also receives the results of the performed deployment simulation tests indicating detected factors that may prevent the successful installation to the indicated client. Based on the received results from the simulation tests, the deployment simulation application indicates whether remote deployment of the anti-malware application to the indicated client will succeed.

BRIEF DESCRIPTION OF THE DRAWINGS

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

A deployment simulator application executes a series of tests to check whether an anti-malware application can be successfully remotely installed on clients in an enterprise network. The deployment simulation is pushed to a selected set of client devices through, for example, a push install tab of an administrative device. A series of deployment simulation tests and, optionally, troubleshooting operations to resolve incompatibility are performed. Upon finishing the tests, the deployment simulator application can provide a report with the simulation results.

In contrast to the conventional installation method, an anti-malware application installation preempted by a deployment simulation will beneficially provide network administrators with a method for quickly determining which client computing devices require special attention prior to being able to successfully install the anti-malware application. The anti-malware application deployment simulator preventing system administrators from having to waste time having to check each client device's configuration settings or repair client devices after failed installations.

Figure 1:
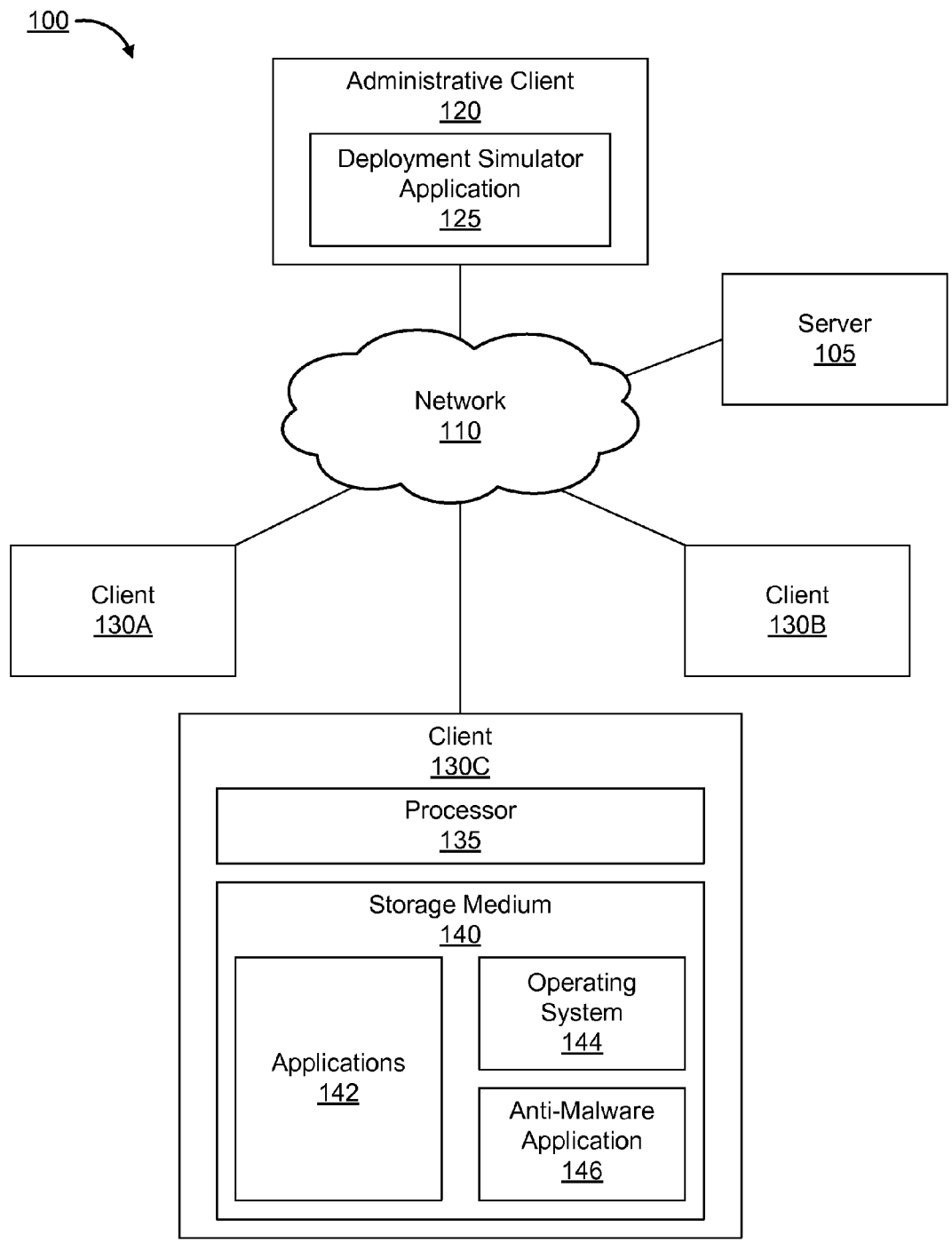
FIG. 1 is a high-level block diagram illustrating a system environment for an anti-malware installation deployment simulator application, in accordance to an embodiment.

FIG. 1 is a high-level block diagram illustrating a system environment 100 for an anti-malware installation deployment simulator application. The system environment 100 comprises a server 105, a network 110, an administrative client 120, and various clients 130A, 130B, 130C (collectively referenced herein as clients 130). For simplicity and clarity, only one server 105 and a limited number of clients 130 are shown; however, other embodiments may include different numbers of servers 105 and clients 130. Furthermore, the system environment 100 may include different or additional entities.

The server 105 is a computer system configured to store, receive, and transmit data to client devices 130 via network 110. The server 105 may include a singular computing system, such as a single computer, or a network of computing systems, such as a data center or a distributed computing system. In an embodiment, the server 105 is a content or data server providing information to a client 130. The server 105 may be used to store a master copy of application files that are installed across several clients 130 as well as files used for updating files across the clients 130. For example, a server 105 may store the primary copy of an anti-malware application. When instructed to install the anti-malware application on several clients, the server 105 may transfer copies of the application to the targeted clients for simulation or installation. In some embodiments, the server may also transfer files to targeted clients for simulation or installation based on a pre-determined policy. When the server 105 receives updated versions of the anti-malware application, the server 105 may also distribute the updated copies to the clients 130. The server 105 may also receive requests for data from clients 130 and respond by transmitting the requested data to the clients 130.

The network 110 represents the communication pathways between the server 105, the administrative client 120, and clients 130. In one embodiment, the network 110 is the Internet. The network 110 can also utilize dedicated or private communications links that are not necessarily part of the Internet. In one embodiment, the network 110 uses standard communications technologies and/or protocols. Thus, the network 110 can include links using technologies such as Ethernet, Wi-Fi (802.11), integrated services digital network (ISDN), digital subscriber line (DSL), asynchronous transfer mode (ATM), etc. Similarly, the networking protocols used on the network 110 can include multiprotocol label switching (MPLS), the transmission control protocol/Internet protocol (TCP/IP), the hypertext transport protocol (HTTP), the simple mail transfer protocol (SMTP), the file transfer protocol (FTP), etc. In one embodiment, at least some of the links use mobile networking technologies, including general packet radio service (GPRS), enhanced data GSM environment (EDGE), long term evolution (LTE), code division multiple access 2000 (CDMA2000), and/or wide-band CDMA (WCDMA). The data exchanged over the network 110 can be represented using technologies and/or formats including the hypertext markup language (HTML), the extensible markup language (XML), the wireless access protocol (WAP), the short message service (SMS) etc. In addition, all or some of the links can be encrypted using conventional encryption technologies such as the secure sockets layer (SSL), Secure HTTP and/or virtual private networks (VPNs). In another embodiment, the entities can use custom and/or dedicated data communications technologies instead of, or in addition to, the ones described above.

Each client 130 comprises one or more computing devices capable of processing data as well as transmitting and receiving data via the network 110. For example, a client device 130 may be a desktop computer, a laptop computer, a smart phone, a tablet computing device, or any other device having computing and data communication capabilities. Each client 130 includes a processor 135 for manipulating and processing data, and a storage medium 140 for storing data and program instructions associated with various applications. The storage medium 140 may include both volatile memory (e.g., random access memory) and non-volatile storage memory such as hard disks, flash memory, flash drives, external memory storage devices, USB drives, discs and the like. In addition to storing program instructions, the storage medium 140 stores various data associated with operation of the operating system 144, the anti-malware application 146, and other applications 142.

In one embodiment, the storage medium 140 comprises a non-transitory computer-readable storage medium. The various applications (e.g., the operating system 144, anti-malware application 146, and other applications 142) are each embodied as computer-executable instructions stored to the non-transitory computer-readable storage medium. The instructions, when executed by the processor 135, cause the client 130 to perform the functions attributed to the applications described herein. For example, when an application 142 executes, either in response to a user command or an automated script, the processor 135 accesses the application 142 in the storage medium 140 and creates a process. The processor 135 then executes the program instructions associated with the process or thread. This execution may include access to other files in the storage medium 140.

The operating system 144 is a specialized application that manages computer hardware resources of the client 130 and provides common services to applications 142. For example, a computer's operating system 144 may manage the processor 135 or other components not illustrated such as, for example, a storage medium, a graphics adapter, an audio adapter, network connections, disc drives, USB slots, and applications. A cell phone's operating system 144 may manage the processor 135, storage medium, display screen, key pad, dialer, wireless network connections and the like. Because many programs and executed processes compete for the limited resources provided by the processor 135, the operating system 144 may manage the processor bandwidth and timing to each requesting process. Examples of operating systems 144 include WINDOWS, MAC OS, IOS, LINUX, UBUNTU, UNIX, and ANDROID.

An anti-malware application 146 prevents, detects and removes malware such as, for example, viruses, malicious browser helper objects, hijackers, ransomware, keyloggers, backdoors, rootkits, Trojan horses, worms, malicious layered service providers, dialers, fraudtools, adware, spyware and so forth. The anti-malware application 146 may prevent new malware from being installed on a client 130 or remove or disable existing malware that is already present on the client 130. The anti-malware application 146 may perform detection by monitoring activities on the client 130 such that if a suspicious process, thread, or executable file starts, the anti-malware application 146 may flag the suspected process for further inspection. The anti-malware application 146 may also disable or remove files determined to be malware. The anti-malware application 146 may also access a related server 105 via the network 110 in order to download new malware definition files and use the files to update its outdated malware definition files. Files may also be downloaded from the server 105 to update the anti-malware application 146 and associated programs.

An administrative client 120 has administrative privileges over one or more of the other clients 130 connected to the network 110. In an embodiment, a client 120 is a specially designated client 130 that is elevated to being an administrative client 120 by being assigned or allowed elevated access privileges. An administrative client 120 does not necessarily have to have any specialized hardware and can be a general purpose client or server. For example, the administrative client 120 may be any computing device hosting a software component that can gives the device administrative privileges over clients 130 connected to the network 110. Through these elevated access privileges, the administrative client 120 has remote access to a client 130 and may be granted permission to perform tasks such as adding, modifying, or removing files that are on a client 130. The administrative client 120 may also have access to the server 105. In an embodiment, when the administrative client 120 starts the installation of an anti-malware application on a client 120, the administrative client 120 instructs the server 105 to retrieve the necessary files from the server 105 and transfer them to the targeted client 130 for installation. In another embodiment, the administrative client 120 may transfer updated anti-malware application files to server 105 for storage and later distribution to the associated clients 130. In addition to other applications, an administrative client 120 includes a deployment simulator application 125 discussed in further detail below.

A possible complication with installing anti-malware applications onto client devices 130 remotely from an administrative client 120 is that the anti-malware application may not be able to successfully install due to differences in client 130 configurations. For example, clients may have different operating systems 144 (e.g., IOS, WINDOWS, LINUX and the like), different system configurations (e.g., conflicting programs, firewalls, routers, access privileges, protection programs and so forth), or different hardware specifications (e.g., memory space, processor speed, hard drive space, cache size, computer architecture and so forth). Furthermore, the network 110 may also not have adequate bandwidth to successfully install the anti-malware application on a client 130. If an installation were attempted and fails, then the client 130 may have numerous residual or corrupt files caused by the failed installation. These residual or corrupt files may have an effect on the operations of the client 130, which may ultimately cause the client 130 to crash.

In an embodiment, the deployment simulator application 125 facilitates a series of tests on a client 130 to predict whether an anti-malware application will be able to successfully install on the client 130. If the test results indicate that the installation will likely be successful, then the deployment simulator application 125 provides the administrative client 120 with the option to proceed with the anti-malware application installation. In the case that the test results indicate that the installation may fail, the deployment simulator application 125 may continue to run further diagnostic and troubleshooting operations to resolve the issue. Upon completion of these operations, the deployment simulator application 125 may provide results as to whether the installation is possible or not on the targeted client 130. If installation is not possible, the deployment simulator application 125 may also provide more detailed explanations as to what issues the deployment application 125 determined from its tests and operations.

While FIG. 1 and the previous examples use anti-malware application 146 as the program to be installed on clients 130, other embodiments may involve the administrative client 120 installing other applications 142 (e.g., word processing applications, gaming applications, applets, browser clients, security updates, media player applications and the like) or operating systems 144 onto clients 130. Furthermore, deployment simulator application 125, in other embodiments, may be included in a client 130 rather than in an administrative client 120. In this embodiment, the administrative client 120 may send a message or signal to a client 130 indicating an application that will be installed on the client 130 prior to transferring the application files. In response to this message or signal, the client 130 may initialize its own deployment simulator application 125 to determine whether it is compatible with the incoming application to be installed.

Installation Deployment Simulation

Figure 2:
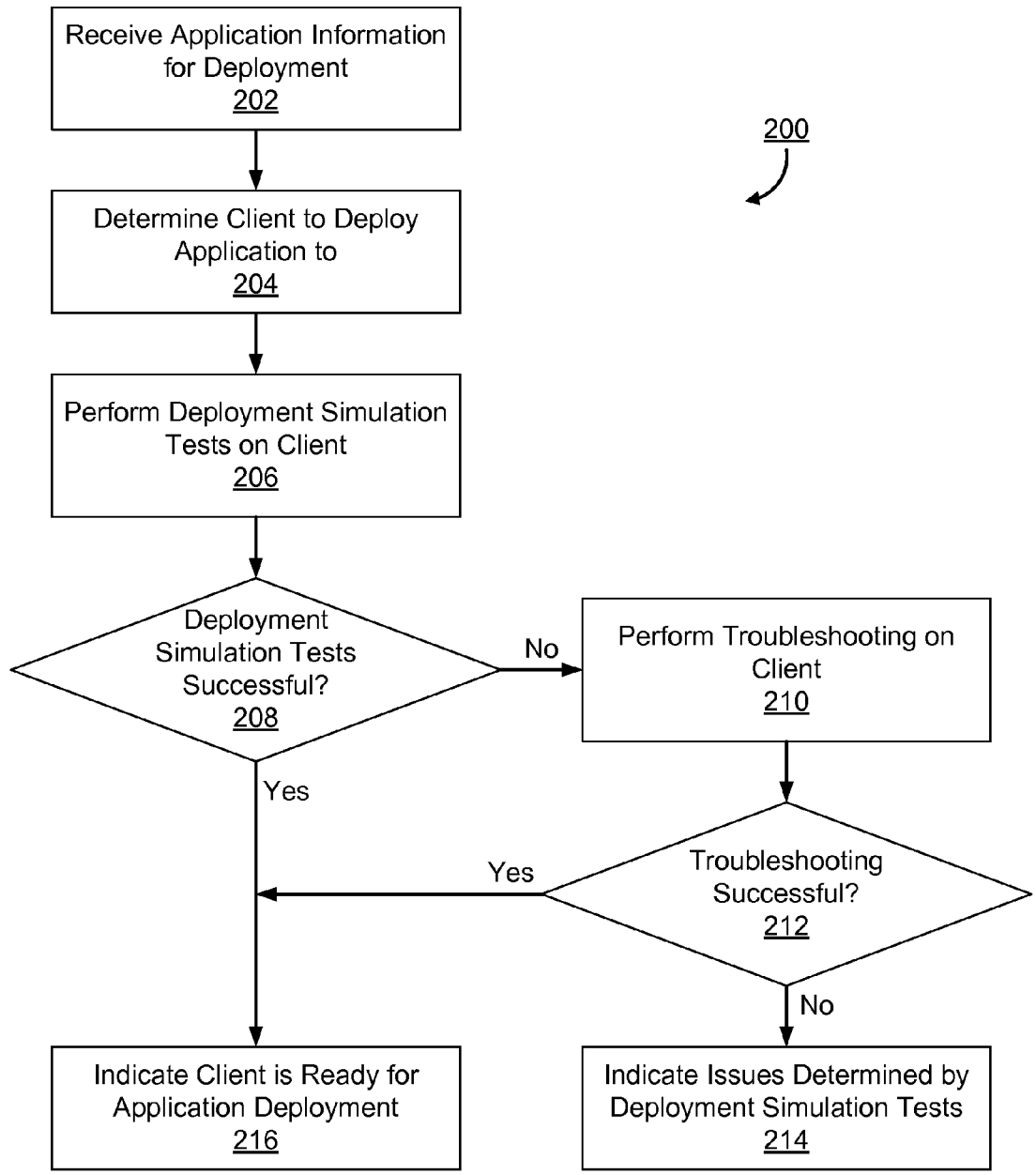
FIG. 2 is a flow diagram illustrating a process for performing an anti-malware installation deployment simulation on a client device, in accordance with an embodiment.

FIG. 2 is a flow diagram illustrating a process for performing an anti-malware installation deployment simulation on a client device. The deployment simulator application 125 receives 202 information regarding an application to install or update among the clients 130. In an embodiment, the application information is received when the administrative client 120 receives an updated main copy of the anti-malware application 146 stored to the server 105. In another embodiment, the application information may be received when an operator instructs the administrative client 120 to deploy a new anti-malware application 146 to linked clients 130 on network 110. In some embodiments, the application information may include update information (e.g., updated virus definition files, updated software files, updated applications files and so forth) for distributing to clients 130.

The deployment simulator application 125 determines 204 which clients 130 connected to the network 110 are targeted to receive the deployed application. In some embodiments, the deployment simulator application 125 may deploy the same anti-malware application 146 to all clients 130 connected to network 110. For example, the administrative client 120 may instruct the deployment simulator application 125 to perform an enterprise-wide anti-malware application upgrade, which involves updating the anti-malware application 146 in all enterprise clients 130 to the designated version stored to the server 105. In other embodiments, the deployment simulator application 125 may specifically target some clients 130 to receive the deployed application. For example, some clients may be more at risk for certain types of malware attacks, which may justify deploying anti-malware applications to these clients separately from the other clients. In some embodiments, the administrative client 120 may perform a client push install where the network is scanned for possible clients 130 to install the anti-malware application 146.

To ensure that the deployed anti-malware application is able to successfully install remotely on the clients 130, the deployment simulator application 125 may perform 206 one or more deployment simulation tests on the targeted clients 130. These tests are designed to detect various issues that may arise during a normal anti-malware application 146 installation process. In some embodiments, the deployment simulation tests may be executed automatically in response to an administrator selecting to push the installation package to a client system. In an embodiment, these deployment simulation tests may detect potential issues related to software/application compatibility, hardware compatibility, network connection, communications, memory, disk space, operating system, administrative access and so forth.

Figure 3:
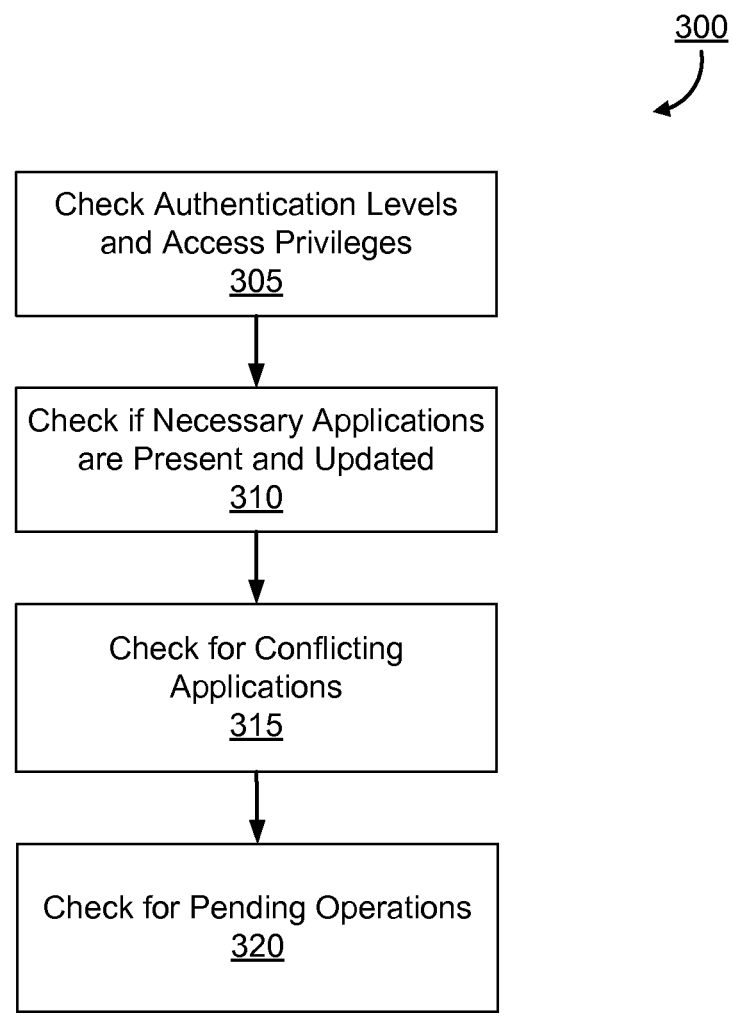
FIG. 3 is a flow diagram illustrating a process for performing simulation deployment tests on a client device, in accordance with an embodiment.

For example, the deployment simulation tests may run through a variety testing processes to detect different aspects of the client 130. FIG. 3 is an example flow diagram illustrating a process for performing simulation deployment tests on a client device. In the embodiment shown in FIG. 3, the deployment simulator check 305 if the user or administrator is properly authenticated and has the appropriate access to the necessary files, keys and locations on the client 130. Furthermore, the deployment simulator checks 310 if the operating system 144 and other system applications 142 are present and/or current enough to meet the system requirements for the anti-malware application 146. For example, these tests may include checking if the operating system 144, .NET Framework, Windows Installer and so forth are installed and up to date. In some embodiments, the deployment simulator may also check 315 if there are any conflicting applications 142, (e.g., a prior version or standalone version of the anti-malware application 146) present on the client 130 that may prevent the new anti-malware application 146 from installing successfully. In an embodiment, this may involve verifying whether a session communications log (i.e., sccomm.log file) is present on the client 130. A session communications log contains logged data that can be used to resolve system errors or performance issues. In some embodiments, the deployment simulator may also check 320 if there are any pending operations, such as installations or uninstallations, that are present on the client 130. In other embodiments, the steps illustrated in FIG. 3 may be performed in different order and/or with one or more steps omitted.

Returning to FIG. 2, using the deployment simulation tests, the deployment simulator application 125 determines 208 whether the anti-malware application may be successfully installed remotely on a client 130. If the client 130 passes the deployment simulation tests, then the client 130 is compatible with the anti-malware application 146. In this instance, the deployment simulator application 125 indicates 216 to the administrative client 120 that the targeted client 130 is ready for the application deployment and installation. However, if the client 130 fails the deployment simulation tests, then the deployment simulator application 125 returns an error message with a description of the issue and/or attempt to perform 210 troubleshooting steps on the client 130.

In an embodiment, the deployment simulator application 125 runs through a standardized list of system configurations, settings or properties to analyze while performing 210 the troubleshooting procedures. The deployment simulator application 125 then aggregates the list of issues it found and presents it to the administrative client 120 in order for the administrative client 120 operator to take corrective steps to resolve the issue. In another embodiment, the deployment simulator application 125 automatically generates a list of possible system configurations, settings or properties to analyze based on the specific deployment simulation test that the client 130 had failed. For example, the deployment simulation test may indicate that the client 130 had failed a network connection test. Using this information, the deployment simulator application 125 limits the scope of the troubleshooting analysis to only issues that may be related to network connections, such as firewalls, blocked Internet addresses, inadequate network bandwidth, incorrect connection settings and so forth.

In some embodiments, the deployment simulator application 125 may attempt to resolve the issues automatically, without additional operator input. However, in other embodiments, the deployment simulator application 125 may request an administrative client 120 operator to input additional commands in order to instruct the deployment simulator application 125 on any further steps to take. For example, the deployment simulator application 125 may detect that an application already installed on the client 130 may be incompatible with the anti-malware application being deployed and is requesting permission from the operator to uninstall the conflicting application. In response to the operator's instructions, the deployment simulator application 125 may uninstall the conflicting application, postpone the anti-malware application 146 deployment, attempt to install the anti-malware application 146 despite the issue, or abort the deployment altogether.

If the deployment simulator application 125 is able to successfully troubleshoot 212 the issues that it had detected, then it may provide an indication 216 to the administrative client 120 that the client 130 is ready for the anti-malware application deployment. Otherwise, if the deployment simulator application 125 detects that the troubleshooting steps were unsuccessful 212, then it may indicate 214 to the administrative client 120 that there may still be unresolved issues in client 130 that may prevent a successful installation of the anti-malware application 146. In this instance, the administrative client 120 may take further steps to attempt to resolve the issue, force an installation of the anti-malware application 146, postpone the installation, or abort the installation.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. For example, the deployment simulator application may be associated with applications other than an anti-malware application in other embodiments. The deployment simulator application may perform a series of tests on a client prior to the deployment and installation of another application in order to predict whether the application may successfully install on the client or whether the client may encounter issues during installation.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method for simulating installation of anti-malware software, comprising:
    receiving, by a computing device, information identifying the anti-malware application to be deployed to one or more clients on a network;
    receiving an indication of a client on which the anti-malware application is to be deployed;
    prior to deploying the anti-malware application to the client, performing deployment simulation tests on the indicated client, the deployment simulation tests analyzing whether the anti-malware application will be able to successfully remotely install to the indicated client;
    receiving results of the performed deployment simulation tests, the results of the performed deployment simulation tests indicating detected factors preventing successful installation to the indicated client;
    responsive to the received results, performing troubleshooting operations attempting to resolve the detected factors preventing the successful installation to the indicated client; and
    indicating whether remote deployment of the anti-malware application to the indicated client will succeed based on the received results of the deployment simulation tests and results of the troubleshooting operations.

2. The method of claim 1, wherein performing the troubleshooting operations comprises removing detected conflicting application or operation from the client.

3. The method of claim 2, further comprising requesting additional administrator instructions for resolving the detected issue.

4. The method of claim 1, wherein receiving an indication of the client on which the anti-malware application is to be deployed comprises receiving instructions via a client push install to perform an anti-malware application deployment.

5. The method of claim 1, wherein the deployment simulation tests further comprises:
   determining whether the client is properly authenticated to access system locations associated with the anti-malware application installation;
   determining whether the operating system and applications associated with the anti-malware application are sufficiently updated for the anti-malware application installation;
   determining whether a conflicting application is installed on the client; and
   determining whether a conflicting operation is in progress on the client.

6. The method of claim 1, further comprising sending the received results of the performed deployment simulation tests to the client as a displayed error message.

7. The method of claim 1, wherein indicating whether the remote deployment of the anti-malware application will succeed further comprises one or more of the following: providing further steps for resolving the detected factors preventing the successful installation, forcing an installation of the anti-malware application, postponing the installation of the anti-malware application; and aborting the installation of the anti-malware application.

8. A non-transitory computer-readable storage medium encoded with executable computer program code for simulating installation of anti-malware software, the computer program code comprising program code for:
   receiving, by a computer device, information identifying the anti-malware application to be deployed to one or more clients on a network;
   receiving an indication of a client on which the anti-malware application is to be deployed;
   prior to deploying the anti-malware application to the client, performing deployment simulation tests on the indicated client, the deployment simulation tests analyzing whether the anti-malware application will be able to successfully remotely install to the indicated client;
   receiving results of the performed deployment simulation tests, the results of the performed deployment simulation tests indicating factors preventing successful installation to the indicated client;
   responsive to the received results, performing troubleshooting operations attempting to resolve the detected factors preventing the successful installation to the indicated client; and
   indicating whether remote deployment of the anti-malware application to the indicated client will succeed based on the received results of the deployment simulation tests and results of the troubleshooting operations.

9. The non-transitory computer-readable storage medium of claim 8, wherein receiving an indication of the client on which the anti-malware application is to be deployed comprises receiving instructions via a client push install to perform an anti-malware application deployment.

10. The non-transitory computer-readable storage medium of claim 8, wherein the deployment simulation tests further comprises:
    determining whether the client is properly authenticated to access system locations associated with the anti-malware application installation;
    determining whether the operating system and applications associated with the anti-malware application are sufficiently updated for the anti-malware application installation;
    determining whether a conflicting application is installed on the client; and
    determining whether a conflicting operation is in progress on the client.

11. The non-transitory computer-readable storage medium of claim 8, further comprising sending the received results of the performed deployment simulation tests to the client as a displayed error message.

12. A system for simulating installation of anti-malware software, the system comprising:
    a processor;
    a non-transitory computer-readable storage medium storing executable instructions that when executed cause the process to perform steps including:
      receive, by a computing device, information identifying the anti-malware application to be deployed to one or more clients on a network;
      receive an indication of a client on which the anti-malware application is to be deployed;
      prior to deploying the anti-malware application to the client, perform deployment simulation tests on the indicated client, the deployment simulation tests analyzing whether the anti-malware application will be able to successfully remotely install to the indicated client;
      receive results of the performed deployment simulation tests, the results of the performed deployment simulation tests indicating detected factors preventing successful installation to the indicated client;
      responsive to the received results, perform troubleshooting operations attempting to resolve the detected factors preventing the successful installation to the indicated client; and
      indicate whether remote deployment of the anti-malware application to the indicated client will succeed based on the received results of the deployment simulation tests and results of the troubleshooting operations.

13. The system of claim 12, wherein receiving an indication of the client on which the anti-malware application is to be deployed comprises receiving instructions via a client push install to perform an anti-malware application deployment.

14. The system of claim 12, wherein the deployment simulation tests further comprises executable instructions configured to:
    determine whether the client is properly authenticated to access system locations associated with the anti-malware application installation;
    determine whether the operating system and applications associated with the anti-malware application are sufficiently updated for the anti-malware application installation;
    determine whether a conflicting application is installed on the client; and
    determine whether a conflicting operation is in progress on the client.

15. The system of claim 12, further comprising executable instructions configured to send the received results of the performed deployment simulation tests to the client as a displayed error message.

16. The system of claim 12, wherein performing the troubleshooting operations comprises removing detected conflicting application or operation from the client.

17. The system of claim 16, further comprising requesting additional administrator instructions for resolving the detected issue.

* * * * *